Dec. 29, 1942.   R. PATERAS PESCARA   2,306,977
INTERNAL COMBUSTION ENGINE
Filed Feb. 24, 1939

Inventor:
Raul Pateras Pescara,
Attorneys

Patented Dec. 29, 1942

2,306,977

UNITED STATES PATENT OFFICE 2,306,977

INTERNAL COMBUSTION ENGINE

Raul Pateras Pescara, Paris, France

Application February 24, 1939, Serial No. 258,285
In Luxemburg March 3, 1938

4 Claims. (Cl. 123—191)

The present invention relates to internal combustion engines and it is more especially, although not exclusively, concerned with explosion engines and, in particular, engines of this kind which are to have a high power in relation to weight.

The object of the present invention is to provide an engine of this kind which is better adapted to meet the requirements of actual practice than those used up to the present time, and, in particular, an engine of higher efficiency.

According to the essential feature of the present invention, while ensuring the distribution of each cylinder of the engine in question by means of at least one inlet valve and at least one exhaust valve located in two opposed portions of the upper wall of the cylinder head, I give the corresponding opposed walls of said cylinder head and of the corresponding cylinder a shape such that they limit a combustion chamber which includes on the one hand, in the region surrounding the inlet valve, a flat-shaped zone, and on the other hand, in the region adjacent to the exhaust valve, a zone of greater height, which constitutes the main part of the volume of the combustion chamber.

Advantageously, according to a preferred embodiment of the invention, the igniting means to be provided in said cylinder are located in said second mentioned zone.

According to another feature of the present invention, the internal combustion engine includes, in each combustion chamber, three valves preferably such that one of them serves to control the inflow of the fuel mixture while the two others serve to the exhaust of the burnt gases, and the upper part of said combustion chamber is given a roughly triangular shape in horizontal section, so that it is possible to position one of said valves at each of the angles of said triangular section, said upper wall projecting advantageously, at least on one side, beyond the circular section of the cylinder and being joined, preferably in a continuous manner, to the cylinder wall.

Other features of the present invention will result from the following detailed description of some specific embodiments thereof.

A preferred embodiment of the present invention will be hereinafter described, with reference to the accompanying drawing, given merely by way of example, and in which.

Figure 1:
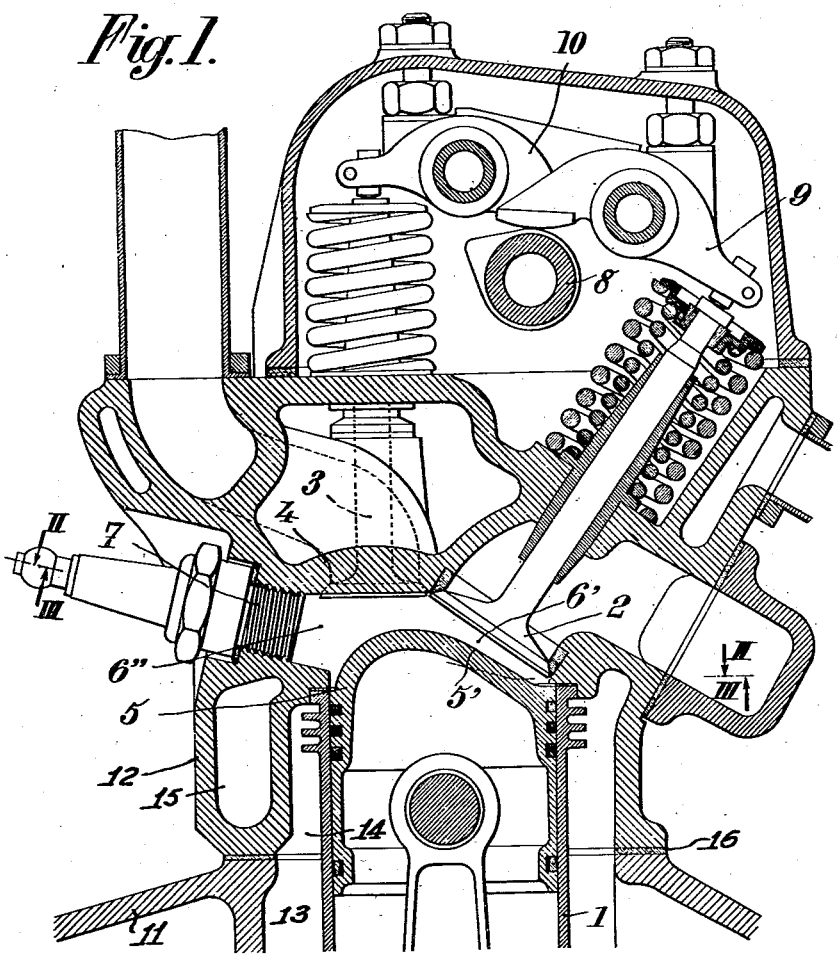
Fig. 1 is an axial sectional view of the cylinder head and the upper part of the cylinder of an explosion engine made according to the present invention.

In the following description, it will be supposed that it is desired to provide an explosion engine of high specific power.

The construction of such an engine is based upon the following considerations:

In order to obtain a high specific power from such an engine, it is necessary to give high values both to the torque delivered by the engine and to its speed of revolution.

The first of these conditions implies the choice of a high rate of compression and in order to comply with the second condition, the volumes of the cylinders must be relatively small so that the values of the forces of inertia acting upon the moving parts are not prohibitive.

Consequently, it is necessary to provide, for said engine, a high number of cylinders, of relatively small bore and corresponding to a high rate of compression.

But, with such an arrangement, considerable difficulties are encountered for ensuring a correct feed of fuel mixture to each of these cylinders, these difficulties being due, on the one hand, to the small bore of the cylinders, which makes it difficult to house therein the spark plug and large size valves, and, on the other hand, to the high speed of revolution of the engine which calls for important sections of flow for the inflow of the fuel mixture and the outflow of the burnt gases from the engine cylinders.

Advantageously, according to the embodiment illustrated by the drawing, each of the cylinders 1 of the engine (which cylinders may be grouped in any suitable manner, for instance in V or W arranged rows) is provided with multiple valves, for instance an inlet valve 2 and two exhaust valves 3, the inlet valve being preferably chosen of a section greater than that of each of the exhaust valves.

The chief feature of the invention lies in the following arrangement:

The inlet valve 2, on the one hand, and the exhaust valves, on the other hand, are housed in two opposed regions 4' and 4" of the upper wall of a cylinder head piece 4 which limits, together with the top face of piston 5, which coacts with cylinder 1, the combustion chamber of said cylinder.

The various portions of said combustion chamber are made of such a shape that it includes a flat-shaped zone 6' opposite the portion 4' (see Fig. 3) of the cylinder head which carries the inlet valve 2, and, on the other hand, a zone of greater height 6" (to which corresponds the greatest part of the volume of the combustion chamber) opposite the portion 4" of the cylinder head which carries the exhaust valves 3 of the cylinder.

Advantageously, according to the invention, I provide, in the zone 6" of the combustion chamber, at least one spark plug 7. Preferably, as in the embodiment illustrated by the drawing, this spark plug is located between the two exhaust valves 3 so that it is in the hottest zone of the combustion chamber, the axis of said spark plug being preferably located along a line substantially perpendicular to the plane of the axes of said exhaust valves.

A combustion chamber having such characteristics is, for instance, made according to the embodiment specifically illustrated by the accompanying drawing.

According to this embodiment, on the one hand the portion 4" of the internal wall of cylinder head 4 (on the side of the exhaust valves) has a surface which is substantially perpendicular to the axis of cylinder 1, and, on the other hand portion 4' (on the side of the inlet valve) has surface inclined with respect to said axis.

The top face of piston 5 is given a convex disymmetric shape in such manner that it includes, opposite surface 4' an inclined surface 5' adapted to limit, together with surface 4', the flat-shaped zone 6' above mentioned.

Figure 2:
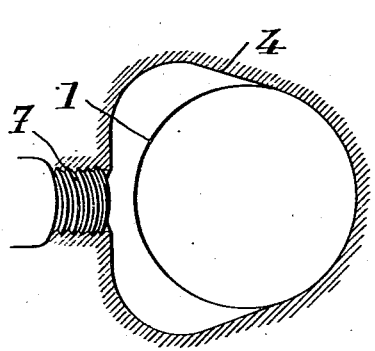
Fig. 2 is a cross sectional view of a diagrammatic character corresponding to the section line II—II of Fig. 1.
Figure 3:
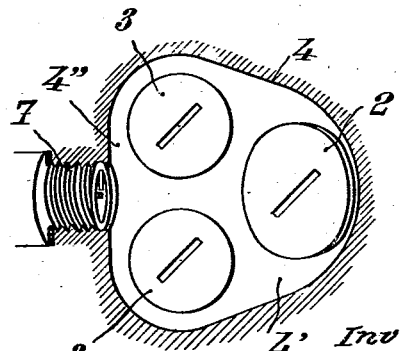
Fig. 3 is a cross sectional view of a diagrammatic character corresponding to the section line III—III of Fig. 1.

Furthermore, according to another feature of the present invention, cylinder head 4 is advantageously arranged in such manner that its upper part has a horizontal section of substantially triangular shape, as shown by Figs. 2 and 3.

With such a shape of the combustion chamber the inlet and exhaust valves are arranged, respectively, at each of the angles of this triangular section. Preferably, in this case, the upper part of the combustion chamber projects, in horizontal projection, beyond the circular cross section of cylinder 1, on the side of the two exhaust valves 3, the wall of the cylinder head being then joined to said cylinder in a continuous manner at its lower part.

With such an arrangement, I avoid any throttling of the passages through which the gaseous streams flow.

This is due to he following facts:

a. On the one hand, the inlet valve is located, in horizontal projection, inside the cylinder outline, so that it can afford regularly increasing sections of passage when it is lifted;

b. On the other hand, the exhaust valves are housed in a part of the combustion chamber the horizontal projection of which projects beyond the cylinder outline, but it is sufficiently high for being joined with said cylinder wall in such manner as to avoid any throttling of the section through which the exhaust gases are caused to flow.

Finally, advantageously, the valves 2 and 3 are controlled through a single camshaft 8 which coacts with said valves through rocker arms 9 and 10, said shaft being preferably located nearer to the inlet valve 2 in order to take account of the inclination of said valve.

It should be noted that such a control of the valves by means of a single camshaft can be easily obtained, with the arrangement according to the present invention owing to the fact that the axes of the inlet and exhaust valves make a relatively small angle with each other and, furthermore, that said axes are located in different planes at right angles to the direction of said cam shaft so that it is possible to operate these valves by means of three rocker arms located side by side.

The explosion engine made as above explained has the following advantages:

Owing to the shape given to each combustion chamber, and also to the arrangement of the valves and the plug in the walls of said chamber, it is possible, while making said chamber of relatively small volume, to provide relatively large inlet and exhaust sections, that is to say to provide a correct feed of the cylinder at high speeds of revolution of the engine, and, therefore, to improve the efficiency of said engine at said speeds.

On the other hand, the flat-shaped zone 6' of the combustion chamber ensures a good turbulence of the mixture admitted into the cylinder, and, further, facilitates the formation of a relatively cold zone capable of opposing the accelerated propagation of combustion (detonation phenomenon), this, in particular, as a consequence of the importance of the surface of piston 5 along which the fresh gases are caused to flow.

As will be noted, the cylinder block 11 terminates short of the top of the cylinder 1, and the cylinder head 12 extends downwardly below the top of the cylinder, the two meeting and being sealed together by a gasket at 16. A common cooling chamber formed of parts 13 and 14 in the cylinder block and cylinder head respectively cools the outside of the cylinder. The downward extension of the cylinder head makes it possible to provide therein a cooling chamber 15 around the spark plug 7, so that even though this spark plug is arranged in a horizontal manner it can be adequately cooled.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. An internal combustion engine which comprises, in combination, a cylinder, a piston movable in said cylinder, a cylinder head forming with the top of said piston a combustion chamber, one inlet valve and two exhaust valves disposed in the upper wall of said cylinder head opposite the cylinder bore, said cylinder head and said top face of said piston being so shaped that said combustion chamber includes in the region surrounding said inlet valve a flat zone and adjacent said exhaust valves a zone of greater height forming most of the volume of said combustion chamber, and ignition means located in the side wall of the zone of greater height of the combustion chamber between said two exhaust valves and having its axis transverse to the plane of the axes of said exhaust valves.

2. An internal combustion engine which comprises, in combination, a cylinder, a piston movable in said cylinder, a cylinder head forming with the top of said piston a combustion chamber, the upper part of which is of substantially triangular transverse section, with an apex portion of small vertical dimension and a base portion of greater vertical dimension, said base portion forming the principal part of the volume of the combustion chamber, one inlet valve and two exhaust valves disposed in the upper wall of said cylinder head opposite the cylinder bore respectively at the apex and at the two corners of the base of said triangular section, and ignition means located in the side wall of the base portion between said two exhaust valves and having its axis transverse to the plane of the axes of said exhaust valves.

3. In a device as claimed in claim 1, said inlet valve being of a greater cross-section than either of said two exhaust valves.

4. An internal combustion engine according to claim 1 in which the ignition means is constituted by a spark plug located between said exhaust valves.

RAUL PATERAS PESCARA.